United States Patent [19]

Hasegawa

[11] Patent Number: 4,465,101

[45] Date of Patent: Aug. 14, 1984

[54] CHANGEOVER VALVE UNIT FOR POWER-ASSISTED STEERING SYSTEMS

[75] Inventor: Akira Hasegawa, Susono, Japan

[73] Assignee: Toyota Jidosha Kabushiki Kaisha, Aichi, Japan

[21] Appl. No.: 420,924

[22] Filed: Sep. 21, 1982

[30] Foreign Application Priority Data

Sep. 29, 1981 [JP] Japan ................. 56-155907

[51] Int. Cl.³ ............................. F15B 9/10
[52] U.S. Cl. ................. 137/625.68; 91/368; 91/382
[58] Field of Search ............... 91/375 A, 375 R, 368, 91/382; 137/625.68

[56] References Cited

U.S. PATENT DOCUMENTS

| | | | |
|---|---|---|---|
| 3,292,499 | 12/1966 | Duffy | 91/382 |
| 3,733,967 | 5/1973 | Duffy | 91/382 |
| 4,381,698 | 5/1983 | Hasegawa et al. | 91/382 |

FOREIGN PATENT DOCUMENTS

| | | |
|---|---|---|
| 56-41941 | 9/1981 | Japan . |
| 56-60680 | 10/1981 | Japan . |
| 56-98781 | 12/1981 | Japan . |

Primary Examiner—Paul E. Maslousky
Attorney, Agent, or Firm—Parkhurst & Oliff

[57] ABSTRACT

A changeover valve unit for a power-assisted steering system includes input and output shafts arranged within a valve housing for relative rotation on aligned axes, a spool valve element concentrically assembled with the input shaft to be axially moved in response to relative rotation of the shafts for controlling the supply of fluid under pressure to a hydraulic cylinder associated with the steering system. An annular seal member of elastic material is secured at its inner periphery to the input shaft and is integrally formed with an annular lip facing the inner periphery of the spool valve element with a predetermined annular clearance. The annular lip is expanded outwardly by back pressure acting on the spool valve element at a higher level than a predetermined value and is brought into engagement with the inner periphery of the spool valve element.

5 Claims, 4 Drawing Figures

CHANGEOVER VALVE UNIT FOR POWER-ASSISTED STEERING SYSTEMS

BACKGROUND OF THE INVENTION

The present invention relates to power-assisted steering systems for wheeled vehicles, and more particularly to a changeover valve unit for controlling the supply of fluid under pressure to a hydraulic cylinder associated with the steering system.

As one of such changeover valve units as described above, there has been proposed a changeover valve unit which includes first and second shafts arranged within a valve housing for relative rotation on aligned axes, a spool valve element concentrically assembled with the first shaft to be shifted in response to relative rotation of the shafts in an axial direction to control the supply of fluid under pressure to the hydraulic cylinder, and a changeover mechanism for effecting axial movement of the spool valve element in response to relative rotation of the shafts, and in which the spool valve element is arranged to be applied therein with a back pressure from outlet ports of the valve housing in its axial movement. In such changeover valve unit, the component parts of the changeover mechanism are provided with appropriate intervening clearances for smooth operation of the valve unit. It is, however, observed that in occurrence of fluctuation of the pressure acting on the spool valve element, the provision of such intervening clearances results in undesired vibration of the spool valve element in the axial direction.

For instance, when a mechanical stopper of the system acts to restrict movement of the steering linkage caused by the operator's effort in steering the steering road wheels under arrest of the vehicle, the spool valve element is reversely moved by reaction acting thereon to receive the fluid under pressure exhaused at a high level from the hydraulic cylinder. Such reverse movement of the spool valve element will occur in the operator's effort in steering the steering road wheels in a reverse direction. As a result, the pressure acting on the spool valve element greatly fluctuates due to the fluid under pressure at the high level to cause undesired vibration of the spool valve element, resulting in occurrence of unpleasant noises and slight vibration of the steering wheel.

SUMMARY OF THE INVENTION

The primary object of the present invention is to provide an improved changeover valve unit for a power-assisted steering system in which the back pressure acting on the spool valve element is effectively utilized in a simple construction to prevent the spool valve element from such undesired vibration as described above.

According to the present invention, there is provided a changeover valve unit for a power-assisted steering system including a driven member for operative connection with the steering road wheels of a wheeled vehicle and being arranged to be power-assisted by a hydraulic cylinder. The changeover valve unit comprises a valve housing provided with an inlet port for connection to a source of fluid pressure, outlet ports for connection to the hydraulic cylinder, and a drain port for connection to a fluid reservoir; first and second shafts arranged within the valve housing for relative rotation on aligned axes; a resilient member interconnecting the shafts for permitting relative rotation of the shafts; a spool valve element in the form of a cylindrical member arranged within the valve housing in surrounding relationship with the first shaft to be moved in response to relative rotation of the shafts in an axial direction for controlling the flow of fluid among the ports; and a changeover mechanism for effecting axial movement of the spool valve element in response to relative rotation of the shafts. In such arrangement of the valve unit, the spool valve element is arranged to be applied therein with a back pressure from the outlet ports in its axial movement, and an annular seal member of elastic material is secured at its inner periphery to the first shaft and formed with an annular lip facing the inner periphery of the spool valve element with a predetermined annular clearnce. The annular lip is brought into contact with the inner periphery of the spool valve element when applied thereto with the back pressure higher than a predetermined value.

It is preferable that a compression coil spring is assembled within the valve housing in surrounding relationship with the first shaft to bias the spool valve element toward the second shaft for eliminating intervening clearances in the changeover mechanism, and the annular seal member is located in the interior of the spool valve element.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PREFERRED EMBODIMENT

Figure 1:
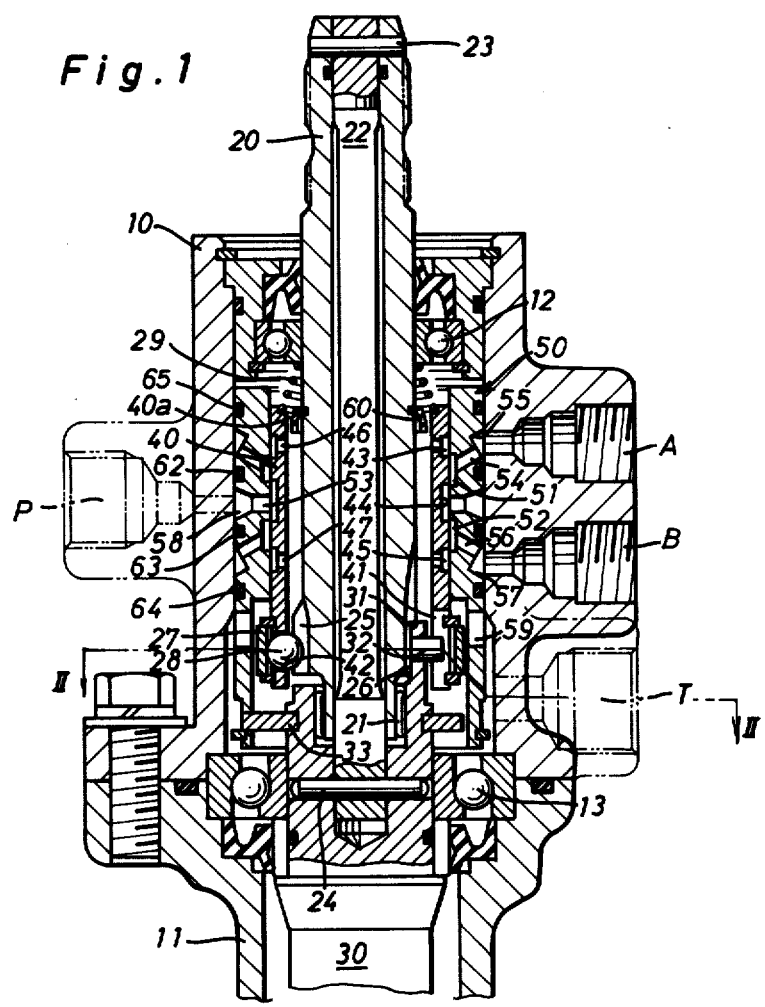
FIG. 1 illustrates a sectional elevation of a changeover valve unit for a power-assisted steering system in accordance with the present invention, which is taken along line I—I in FIG. 2.
Figure 2:
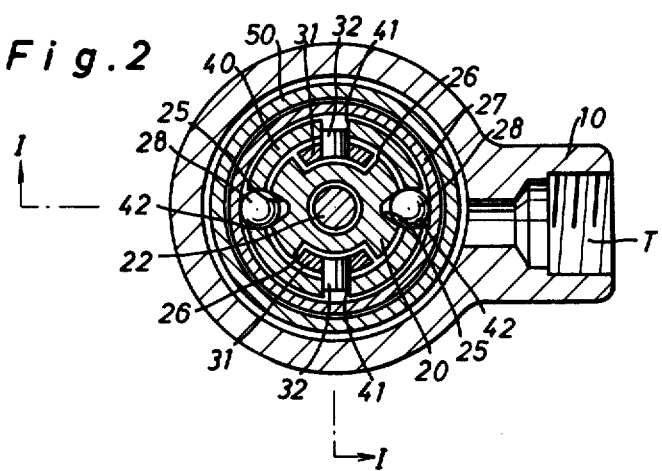
FIG. 2 is a cross-sectional view taken along line II—II in FIG. 1.
Figure 3:
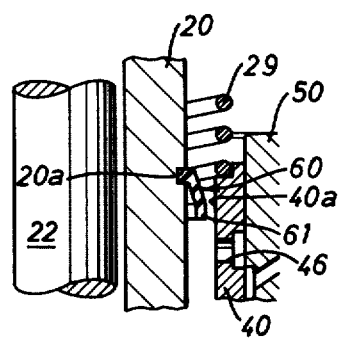
FIG. 3 is an enlarged sectional view of a portion of the changeover valve unit of FIG. 1.

With reference to the drawings, FIGS. 1-3 illustrate a changeover valve unit for a power-assisted steering system in accordance with the present invention which includes an input shaft 20 in the form of a hollow shaft extending into a valve housing 10, and an output shaft 30 journalled within a gear housing 11 and extending into the valve housing 10 coaxially with the input shaft 20. The valve housing 10 is fitted to the gear housing 11 via an O-ring in a fluid-tight manner. The input and output shafts 20 and 30 are arranged for relative rotation and connected to each other by means of a torsion bar 22 one end of which is pinned at 23 to the input shaft 20 and the other end of which is pinned at 24 to the output shaft 30. Thus, the torsion bar 22 acts to transmit a torque applied to the input shaft 20 to the output shaft 30 and strains to permit relative rotation between the input and output shafts 20 and 30.

The input shaft 20 is rotatably supported by a ball bearing 12 and a needle-bearing 21 which are respectively carried on the valve housing 10 and within the upper end of output shaft 30. The input shaft 20 is further provided at its lower end portion with a pair of helical follower grooves 25, 25 and a pair of axial recesses 26, 26, as can be well seen in FIG. 2. The output shaft 30 is rotatably supported by a pair of ball bearings 13 which are carried on the gear housing 11. (In the figure, only one of the ball bearings 13 is illustrated.) The output shaft 30 is integrally formed at its upper end with a pair of axial projections 31 which are contained within the corresponding axial recesses 26 in the lower end portion of input shaft 20, there being a circumferential clearance between each of the axial projections 31 and each of the axial recesses 26 to permit relative rotation between the input and output shafts 20 and 30, as can be well seen in FIG. 2. A lateral pin 32 is fixed to each of the axial projections 31 of output shaft 30 and engages with each of axial slots 41 in the lower end portion of a spool valve element 40 for guiding axial movement of the spool valve element 40.

The spool valve element 40 is in the form of a cylindrical member in surrounding relationship with the input shaft 20 such as to be axially moved in response to rotation of the input shaft 20, as described hereinafter. The spool valve element 40 is formed at its lower end portion with a pair of radial bores 42, 42 in which a pair of steel balls 28, 28 are rotatably contained. The steel balls 28 are rotatable within each of the helical follower grooves 25, 25 in the lower end portion of input shaft 20 and retained in place by a retainer collar 27 which is fixed by a pair of retaining rings on the lower end of spool valve element 40. In this embodiment, the above arrangement of steel balls 28 and lateral pins 32 provides a changeover mechanism for effecting axial movement of the spool valve element 40 in response to relative rotation of the shafts 20 and 30. A compression coil spring 29 in surrounding relationship with input shaft 20 is engaged at its one end with the upper end of spool valve element 40 and at its other end with the inner race of ball bearing 12 to bias the spool valve element 40 toward the output shaft 30 for resiliently eliminating intervening clearances between spool valve element 40 and steel balls 28 and between helical follower grooves 25 and steel balls 28. The spool valve element 40 is further provided at its outer periphery with annular grooves 43, 44 and 45. The upper and lower annular grooves 43 and 45 are in open communication with the interior of spool valve element 40 through radial holes 46 and 47.

A cylindrical valve casing 50 surrounds the spool valve element 40 within valve housing 10 and is connected at its lower end with the upper end of output shaft 30 by means of a thrust plate 33 in the form of a C-shaped plate. The thrust plate 33 is rotatably coupled at its inner periphery with the output shaft 30 and is secured at its outer periphery to the valve casing 50. The valve casing 50 is formed at its inner periphery with annular grooves 51 and 52 which cooperate with the annular grooves 43, 44, 45 of spool valve element 40 to control fluid flow from an inlet port P into one of first and second outlet ports A and B and from the other outlet port to a drain port T. The valve casing 50 is also formed with radial holes 53 in open communication with the intermediate annular groove 44 of spool valve element 40. The valve casing 50 is further provided at its outer periphery with axially spaced annular oil-seal members, 62, 63, 64, 65 and is formed with annular grooves 55, 58, 57. The annular groove 55 opens toward the first outlet port A and is in open communication with the annular groove 51 through radial holes 54. The annular groove 57 opens toward the second outlet port B and is in open communication with the annular groove 52 through radial holes 56. The annular groove 58 opens toward the inlet port P and is in open communication with the intermediate annular groove 44 of spool valve element 40 through radial holes 53. The valve casing 50 is further provided at its lower portion with radial holes 59 through which the interior of spool valve element 40 communicates with the drain port T.

With such arrangement as described above, the spool valve element 40 is applied therein with a back pressure from the outlet ports A and B in its axial movement. In the illustrated embodiment, the inlet port P of valve housing 10 is connected to a source of fluid pressure in the form of a hydraulic pump (not shown), the outlet ports A and B are connected in a usual manner to the right and left fluid chambers of a hydraulic cylinder (not shown) respectively, and the drain port T is connected to a fluid reservoir (not shown). The output shaft 30 is integrally formed with a pinion (not shown) which is meshed in a usual manner with a rack member (not shown) for operative connection with the steering road wheels of the vehicle by means of a steering linkage. The rack member is actuated by the hydraulic cylinder.

For the purpose of preventing the spool valve element 40 from undesired vibration caused by the back pressure, an annular seal member 60 of such elastic material as synthetic rubber is secured at its inner periphery to the intermediate portion of input shaft 20 and is formed with an annular lip 61 facing the inner periphery 40a of spool valve element 40 with a predetermined annular clearance, as can be well seen in FIG. 3. In such arrangement, the annular seal member 60 has an inner peripheral rim fixedly coupled with an annular groove 20a of input shaft 20 and is located in the interior of spool valve element 40. The annular lip 61 of seal member 60 is arranged adjacent the radial holes 46 of spool valve element 40 and opens toward the output shaft 30 to be expanded outwardly by the back pressure BP acting on spool valve element 40. When the back pressure BP is below a predetermined value $BP_1$, the annular lip 61 of seal member 60 separates from the inner periphery 40a of spool valve element 40 to freely permit axial movement of the spool valve element 40. When the back pressure BP exceeds the predetermined value $BP_1$, the annular lip 61 of seal member 60 is expanded outwardly and brought into contact with the inner periphery 40a of spool valve element 40.

Hereinafter, the operation of the changeover valve unit will be described in detail. When the operator applies a torque to the steering wheel in one sense, the torque is applied to the input shaft 20 and transmitted to the output shaft 30 through torsion bar 22. Correspondingly, the steel balls 28 roll along helical follower grooves 25 in response to relative rotation between the input and output shafts 20 and 30 to conduct axial movement of the spool valve element 40. The axial movement of spool valve element 40 is guided by slidable engagement with the lateral pins 32 fixed to output shaft 30. Thus, the spool valve element 40 cooperates with the valve casing 50 to control the flow of fluid under pressure from the inlet port P to one of the outlet ports A and B.

During the axial movement of spool valve element 40 as described above, the fluid under pressure from inlet port P is supplied into one of the fluid chambers of the hydraulic cylinder, while the fluid exhausted at a low level from the other fluid chamber flows into the interior of spool valve element 40 through the other outlet port A or B and returns into the fluid reservoir through drain port T. This results in effect of power assisting operation of the steering system. When the steering wheel is arrested in its steered position during power assisting operation of the system, the steel balls 28 roll along the helical follower grooves 25 in dependence upon rotation of the power assisted output shaft 30 to return the spool valve element 40 to its neutral position. When the steering wheel is released during power assisting operation of the system, the steel balls 28 roll along the helical follower grooves 25 in response to release of the torque to input shaft 20 to return the spool valve element 40 to its neutral position. When a mechanical stopper of the system acts to restrict movement of the steering linkage caused by the operator's effort in steering the steering road wheels under arrest of the vehicle, the spool valve element 40 is reversely moved by reaction acting thereon. Such reverse movement of the spool valve element 40 will occur in the operator's effort in steering the steering road wheels in a reverse direction.

Figure 4:
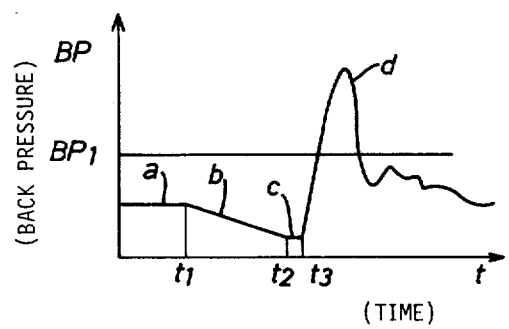
FIG. 4 is a graph showing change of a back pressure acting on a spool valve element of the valve unit in relation to lapse of time.

In such operation, the fluid under pressure exhausted at a high level from the hydraulic cylinder suddenly flows into the interior of spool valve element 40 and returns into the fluid reservoir through drain port T. As a result, the back pressure BP acting on spool valve element 40 sharply increases at a time $t_3$ in FIG. 4 and exceeds the predetermined value $BP_1$ as shown by the reference character d in FIG. 4. In this instance, the annular lip 61 of seal member 60 on input shaft 20 is expanded outwardly by the back pressure BP and resiliently engages the inner periphery 40a of spool valve element 40 to prevent the spool valve element 40 from undesired vibration caused by such fluctuation of the back pressure BP as described above. This serves to eliminate occurrence of unpleasant noises and slight vibration of the steering wheel. In FIG. 4, the character a indicates a level of the back pressure BP acting on the spool valve element in its neutral position, the character b indicates change of the back pressure BP between times $t_1$ and $t_2$ in operation of the changeover valve unit, and the character c indicates a level of the back pressure BP between times $t_2$ and $t_3$ when the steering linkage abuts against the mechanical stopper of the system.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A changeover valve unit for a power-assisted steering system, comprising: a valve housing provided with an inlet port, outlet ports, and a drain port; first and second shafts arranged within said valve housing for relative rotation on aligned axes; a resilient member interconnecting said shafts for permitting relative rotation of said shafts; a spool valve element in the form of a cylindrical member arranged within said valve housing in surrounding relationship with said first shaft to be moved in response to relative rotation of said shafts in an axial direction for controlling the flow of fluid among said ports, said spool valve element being arranged to be applied therein with a back pressure from said outlet ports in its axial movement; a changeover mechanism for effecting axial movement of said spool valve element in response to relative rotation of said shafts; and an annular seal member of elastic material secured at its inner periphery to said first shaft and formed at its outer periphery with an annular lip facing the inner periphery of said spool valve element with a predetermined annular clearance, said annular lip being brought into contact with the inner periphery of said spool valve element by the back pressure acting thereto at a higher level than a predetermined value.

2. A changeover valve unit as claimed in claim 1, wherein a compression coil spring is assembled within said valve housing in surrounding relationship with said first shaft to bias said spool valve element toward said second shaft for eliminating intervening clearances in said changeover mechanism.

3. A changeover valve unit as claimed in claim 2, wherein said compression coil spring is interposed between one end of said spool valve element and an inner race of a bearing for said first shaft, and said annular seal member is located in the interior of said spool valve element.

4. A changeover valve unit as claimed in claim 1, further comprising a valve casing in surrounding relationship with said spool valve element within said valve housing and cooperating with said spool valve element for controlling the flow of fluid among said ports, and wherein said changeover mechanism includes a mechanical coupling for restricting the relative rotation of said shafts in a predetermined angular range.

5. A changeover valve unit for a power-assisted steering system, comprising: a valve housing provided with an inlet port, outlet ports, and a drain port; input and output shafts arranged within said valve housing for relative rotation on aligned axes; a resilient member interconnecting said shafts for permitting relative rotation of said shafts; a spool valve element in the form of a cylindrical member arranged with said valve housing in surrounding relationship with said input shaft to be moved in response to relative rotation of said shafts in an axial direction; a cylindrical valve casing in surrounding relationship with said spool valve element within said valve housing and cooperating with said spool valve element for controlling the flow of fluid among said ports; means for effecting axial movement of said spool valve element in response to relative rotation of said shafts, and in which said spool valve element is arranged to be applied therein with a back pressure from said outlet ports in its axial movement; and an annular seal member of elastic material secured at its inner periphery to said input shaft and formed at its outer periphery with an annular lip facing the inner periphery of said spool valve element with a predetermined annular clearance and opening toward said output shaft, said annular lip being arranged to be expanded outwardly by the back pressure acting thereto at a higher level than a predetermined value and brought into engagement with the inner periphery of said spool valve element.

* * * * *